(12) United States Patent
Picker et al.

(10) Patent No.: US 7,758,123 B2
(45) Date of Patent: Jul. 20, 2010

(54) VEHICLE SEAT

(75) Inventors: Andre Picker, Hospe (DE); Mareike Krahn-Lau, Hannover (DE); Klaus-Dieter Habedank, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 12/037,728

(22) Filed: Feb. 26, 2008

(65) Prior Publication Data

US 2008/0203796 A1 Aug. 28, 2008

(30) Foreign Application Priority Data

Feb. 26, 2007 (DE) .................. 10 2007 009 211

(51) Int. Cl.
*B60N 2/30* (2006.01)

(52) U.S. Cl. .................. 297/336; 297/333; 297/334; 296/65.09

(58) Field of Classification Search ............ 297/256.16, 297/331, 341, 332, 336, 333, 334; 296/65.09
See application file for complete search history.

(56) References Cited

U.S. PATENT DOCUMENTS

| | | | | | |
|---|---|---|---|---|---|
| 4,736,985 | A | * | 4/1988 | Fourrey et al. | 297/331 |
| 5,238,285 | A | * | 8/1993 | Holdampf et al. | 296/65.03 |
| 6,135,555 | A | * | 10/2000 | Liu et al. | 297/336 |
| 6,293,603 | B1 | * | 9/2001 | Waku et al. | 296/65.09 |
| 6,375,245 | B1 | * | 4/2002 | Seibold et al. | 296/65.03 |
| 6,375,255 | B1 | * | 4/2002 | Maruta et al. | 297/15 |
| 6,382,491 | B1 | * | 5/2002 | Hauser et al. | 296/65.05 |
| 6,520,581 | B1 | * | 2/2003 | Tame | 297/336 |
| 6,860,562 | B2 | * | 3/2005 | Bonk | 297/378.12 |
| 6,991,293 | B2 | * | 1/2006 | Lang et al. | 297/336 |
| 7,048,330 | B2 | * | 5/2006 | Daniel | 297/15 |
| 7,100,984 | B2 | | 9/2006 | Epaud et al. | |
| 7,121,624 | B2 | * | 10/2006 | Pejathaya et al. | 297/378.12 |
| 7,222,918 | B2 | * | 5/2007 | Bronner et al. | 297/341 |
| 7,306,278 | B2 | * | 12/2007 | Holdampf | 296/65.09 |
| 7,434,862 | B2 | * | 10/2008 | Lutzka et al. | 296/65.03 |
| 2004/0124684 | A1 | * | 7/2004 | Bonk | 297/378.12 |
| 2006/0113828 | A1 | * | 6/2006 | Ryan et al. | 297/336 |
| 2007/0246985 | A1 | * | 10/2007 | Sahi | 297/331 |

FOREIGN PATENT DOCUMENTS

CA 2411728 6/2003

(Continued)

*Primary Examiner*—Peter R. Brown
(74) *Attorney, Agent, or Firm*—Kenyon & Kenyon LLP

(57) ABSTRACT

A vehicle seat includes: a frame part, which is lockable in its rear region on a rear foot or on the chassis side and is pivoted in a front hinge in a swiveling manner; a seat back pivoted in a seat back pivot on the frame part in a foldable manner; and a seat part for accommodating a user, which is adjustable downward into a lowered position when the seat back is folded forward. The seat part may be interlocked with the frame part in its lowered position, whereby the front lock of the frame part is released. Three positions may be set: a use position for accommodating a user, a functional position, in which the seat back is folded forward, and a storage position, which is adjustable from the functional position by releasing the rear lock of the frame part, interlocking the frame part with the seat part and folding forward about a front rocker.

19 Claims, 4 Drawing Sheets

FOREIGN PATENT DOCUMENTS

| | | |
|---|---|---|
| DE | 195 14 380 | 11/1995 |
| DE | 101 38 459 | 10/2002 |
| DE | 10257601 | 6/2003 |
| DE | 10 2005 003 048 | 8/2006 |
| EP | 1211125 | 6/2002 |

* cited by examiner

Fig. 2

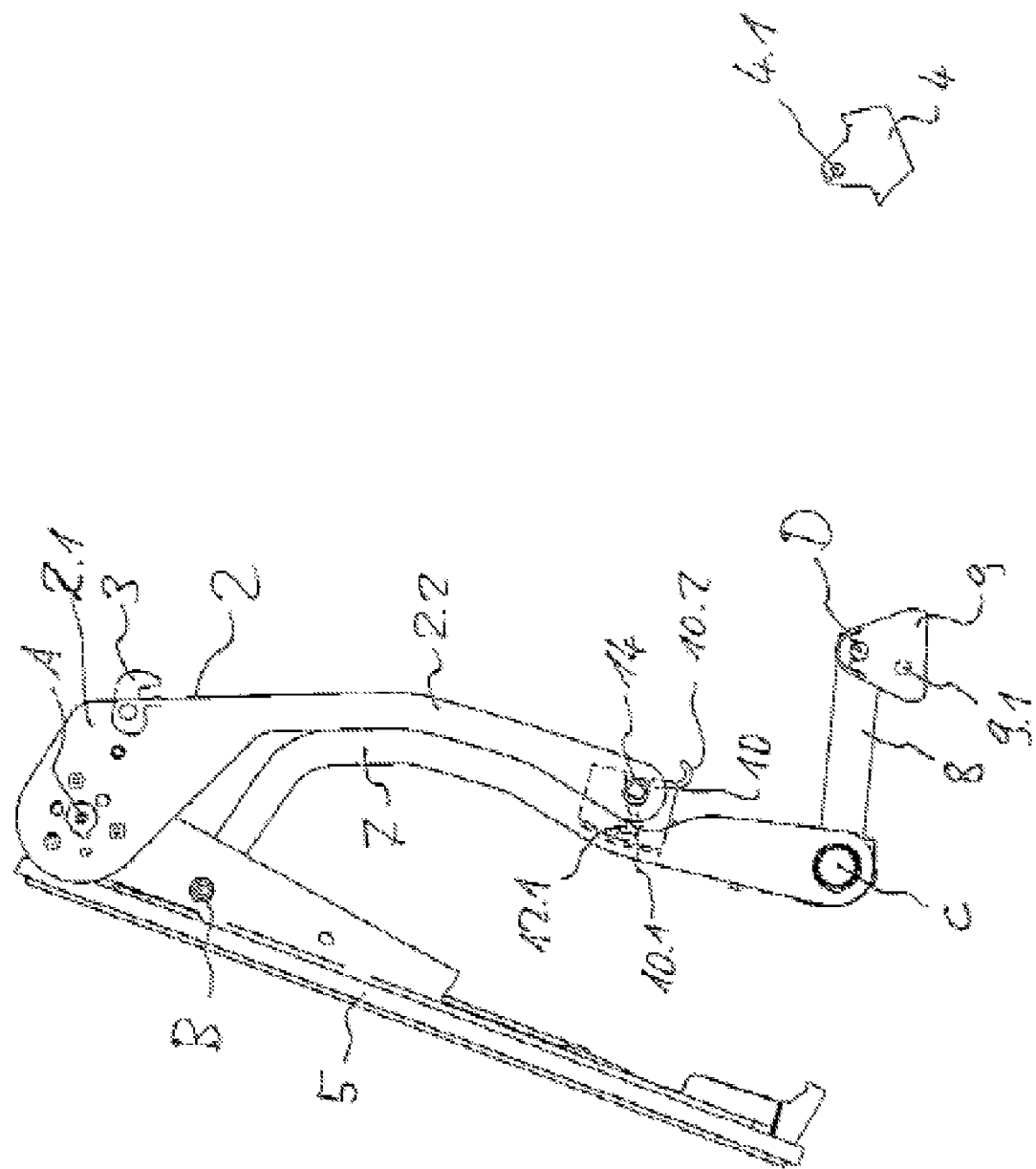

VEHICLE SEAT

CROSS-REFERENCE TO RELATED APPLICATIONS

The present application claims priority to Application No. 10 2007 009 211.5, filed in the Federal Republic of Germany on Feb. 26, 2007, which is expressly incorporated herein in its entirety by reference thereto.

FIELD OF THE INVENTION

The present invention relates to a vehicle seat.

BACKGROUND INFORMATION

A vehicle seat of this kind may be used, for example, in a use position or sitting position with an substantially upright seat back, it being possible for the seat back to be adjustable in terms of inclination about its seat back pivot within a comfort swivel range. Furthermore, a functional position is provided, in which, after releasing its seat back lock, the seat back may be folded forward, e.g., into a substantially horizontal loading floor or table position.

European Published Patent Application No. 1 211 125 describes a vehicle seat whose seat part is fastened in its rear region on a bearing block and in its front region is pivoted via a front rocker on the chassis side. The seat back may be initially folded forward such that it comes to lie on the seat part, while subsequently the entire vehicle seat may be folded forward into a storage position about the pivot of the front rocker on the chassis or on a front bearing block.

German Published Patent Application No. 102 57 601 describes a fastening system for a vehicle seat in which a support device accommodating a seat part is lockable in its rear region on an engaging element on the chassis side and is capable of being folded forward about a front axis after it is unlocked. Furthermore, the seat back is capable of being folded forward from the upright use position into a functional position such that in the subsequent unlocking of the rear engaging element the folded seat may be folded forward into the storage position.

U.S. Pat. No. 7,100,984 describes another vehicle seat whose seat part in its front region is pivoted via two legs acting as rockers on the chassis and in its rear region is pivoted on the seat back above the latter's seat frame-side seat back pivot. When folding the seat back forward, the seat part is adjusted forward and downward and frees the swivel space for the seat back such that the vehicle seat is adjustable into a table position having a substantially horizontal backside of the seat back. Furthermore, the connection of the front leg to the chassis may be released and the seat part may subsequently be folded up backward to the seat back.

A disadvantageous aspect of conventional adjustments is, among other things, that no locking mechanisms suitable for all positions are provided, which sufficiently fixate or secure these positions.

SUMMARY

Example embodiments of the present invention provide a vehicle seat that allows for a high functionality having various positions, a simple adjustment and a secure fixation in the various positions.

Example embodiments of the present invention provide for a frame part (or foot frame part or foot bracket part) attached on its front end on the chassis side or on a front foot in a detachable and lockable manner and additionally for a seat part (seat cushion frame) used for accommodating the user, which is adjustable on its front end via, e.g., a front rocker and is pivoted on its rear end on the seat back. According to example embodiments of the present invention, a lock is provided between the seat part and the frame part. For this purpose, cooperating locking devices are provided on the seat part and on the frame part. The locking device of the seat part may be provided in a central region of the seat part, e.g., on its bottom side, and may have, e.g., a form-locking receptacle and a pin for receiving a hook pivoted on the frame part, or alternatively may have, e.g., a rotary-latch lock. In this context, the central region of the seat part may be considered to be the region between its front hinge and its rear hinge, e.g., a rocker or a link being pivoted on its front hinge and its rear hinge being used for pivoting on the seat back, e.g., above its seat back pivot.

Thus, with respect to, e.g., European Published Patent Application No. 1 211 125 and U.S. Pat. No. 7,100,984 the vehicle seat according to example embodiments of the present invention has, in addition to the frame part, an adjustable seat part such that a more complex adjustment is possible.

According to example embodiments of the present invention, the rear lock of the frame part on the rear foot or chassis is releasable. On the front end of the frame part, an alternating lock, e.g., a swiveling double hook, may be provided, which interlocks the frame part either with the lowered seat part or with the front foot or chassis.

Thus, according to example embodiments of the present invention, at least three positions are settable, between which a user may switch with little effort. In the use position, the frame part or foot bracket is locked in front and back on the chassis side, the seat back is in an upright use position, e.g., slightly tilted backward, and the seat part or seat cushion is in a raised position for accommodating the user.

Starting from this use position, the user is able, e.g., by releasing a seat back lock, to fold the seat back forward into a, e.g., substantially horizontal functional position, which may be used, e.g., as a table position or for enlarging a loading space behind it. Subsequently, the user, by releasing the rear lock of the frame part or foot bracket, unlocking the lock of the front end of the frame part on the chassis side or foot side and the associated coupled lock on the seat part, is able to fold the folded seat forward into a storage position, in which the vehicle seat is displaced forward about the upper or front pivot point of the front rocker into a, e.g., substantially vertical position and thereby frees up a substantial rear storage space.

Thus, according to example embodiments of the present invention, starting from the use position, a folding into the horizontal functional position or tablet position may be achieved, in which then the seat part is interlocked with the foot frame part such that a solid, foldable unit is formed, which may subsequently be swiveled forward into the storage position. Thus a high degree of user-friendliness is achieved.

The user is thus required to perform only a few maneuvers to achieve three stable, secured positions.

According to an example embodiment of the present invention, a vehicle seat includes: a frame part lockable in a rear region on at least one of (a) a rear foot and (b) a chassis side and pivotably hinged on a front hinge; a seat back foldably hinged in a seat back pivot on the frame part; and a seat part adapted to accommodate a user, the seat part is adjustable downwardly into a lowered position when the seat back is folded forward. The seat part, in the lowered position, is interlockable with the frame part.

The seat part, in a central region, may include a lock device adapted to interlock with the frame part in the lowered position of the seat part.

The frame part together with the lowered and interlocked seat part and the seat back folded forward may be foldable forward into a storage position after release of a rear lock.

The frame part may include at least one of (a) a two-sided lock device and (b) a swivelable double hook alternatively lockable on a front foot and at least one of (a) the seat part and (b) a pin on the seat part.

A bottom side of the seat part may include a form-lockable receptacle adapted to receive a hinge pin of the swivelable double hook.

A bottom side of the seat part may include at least one of (a) a lock and (b) a rotary-latch lock adapted to receive at least one of (a) a hinge and (b) a pin arranged on the frame part when the seat part is lowered.

The vehicle seat may include a front rocker pivotably arranged between a front region of the seat part and at least one of (a) a front foot and (b) a vehicle chassis, the seat part may be pivotably arranged on the seat back in a hinge arranged above the seat back pivot, the front rocker may be swivelable forward when the seat back is folded forward, and the front region of the seat part may be adjustable forward and downward.

The vehicle seat may include a front rocker pivotably arranged between a front region of the seat part and at least one of (a) a front foot and (b) a vehicle chassis, the seat part may be pivotably arranged on the seat back in a hinge arranged above the seat back pivot, the front rocker may be swivelable forward when the seat back is folded forward, and the front region of the seat part may thereby be adjustable forward and downward.

The vehicle seat may be adjustable in at least the following positions: a use position, in which the frame part is locked in front and in the rear on at least one of (a) a vehicle chassis and (b) feet, the seat back is upright, and the seat part is in a raised position arranged to accommodate a user; a forward-folded functional position, which is adjustable by unlocking at least one seat back lock between the frame part and the seat back and by folding the seat back forward, the seat part lowered downward and displaced forward; and a storage position, which is adjustable from the functional position by: locking the seat part on the frame part and releasing a front lock of the frame part; releasing a rear lock of the frame part; and folding the frame part forwardly together with the seat back and the locked seat part at least one of (a) forward and (b) about a front rocker.

The frame part may be arranged as a foot bracket and may include: a rear console region, which includes the seat back pivot having at least one of (a) a seat back lock and (b) a latch adjuster and a rear lock for at least one of (a) a rear foot and (b) the vehicle chassis; and a front coupling bar region, which includes a lock device for at least one of (a) a front foot and (b) the seat part.

A front rocker may be pivotably arranged on the front coupling bar region.

The vehicle seat may include a latch adjuster adapted to adjust an inclination of the seat back.

In the storage position, the vehicle seat may be in a substantially vertical orientation.

In the forward-folded functional position, the seat back may be in a substantially horizontal orientation.

The forward-folded functional position may correspond to at least one of (a) a table position and (b) a loading floor position.

At least one of (a) the frame part, (b) the lock device, (c) the rear lock, (d) the two-sided lock device, and (e) the swivelable double hook may be unlockable by a Bowden cable.

According to an example embodiment of the present invention, a motor vehicle includes a vehicle seat having one or more of the foregoing features.

Example embodiments of the present invention are described in further detail below with reference to the appended Figures.

BRIEF DESCRIPTION OF THE DRAWINGS

FIG. 2 is a side view of the vehicle seat having its seat back folded forward into the functional position and having the foot bracket locked in back and front on the foot side.

FIG. 4 is a side view of the storage position subsequently achieved by folding the entire vehicle seat forward.

DETAILED DESCRIPTION

Figure 1:
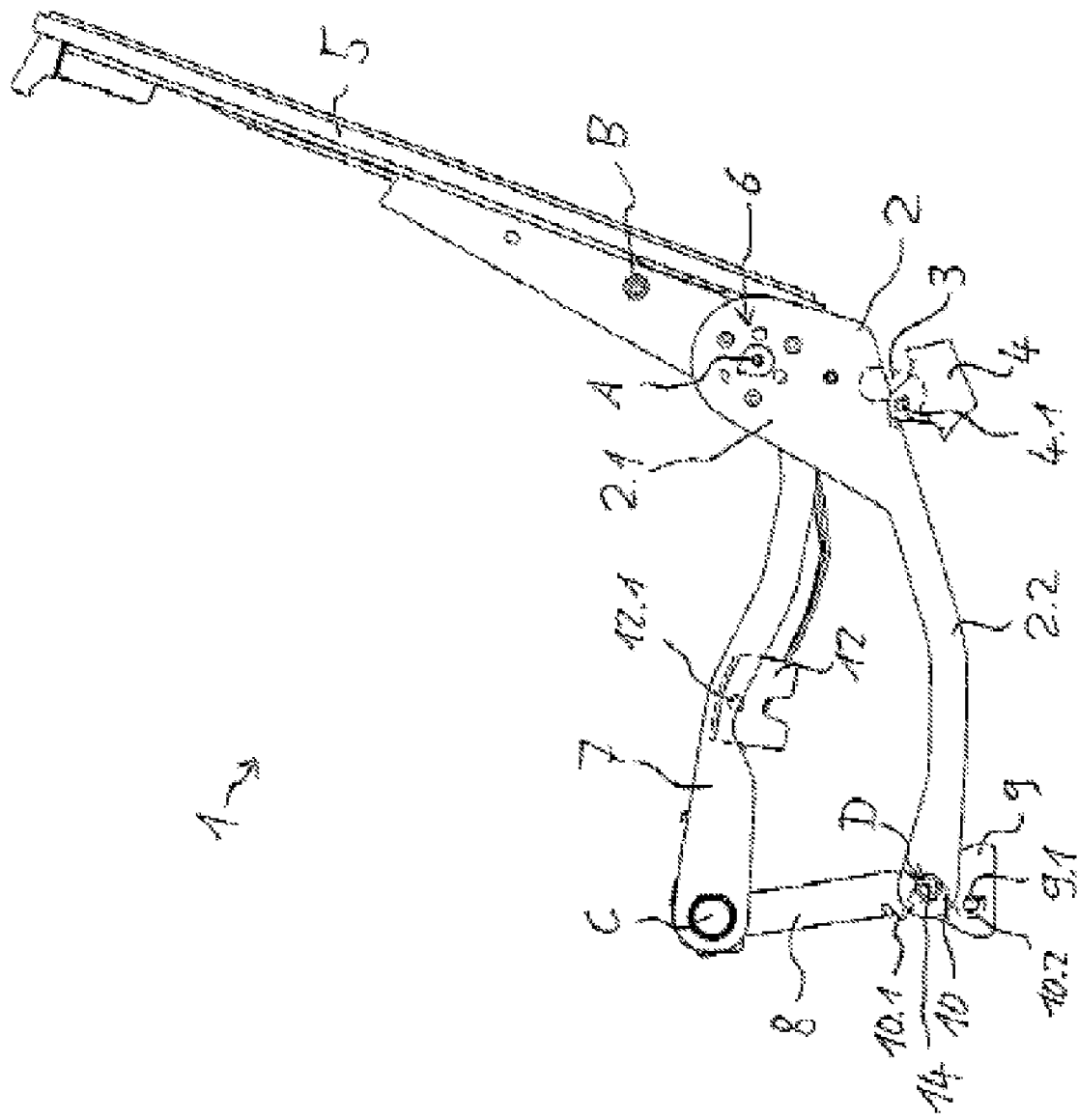
FIG. 1 is a side view of a vehicle seat according to an example embodiment of the present invention without cushion and covers in the locked upright use position.
Figure 2:
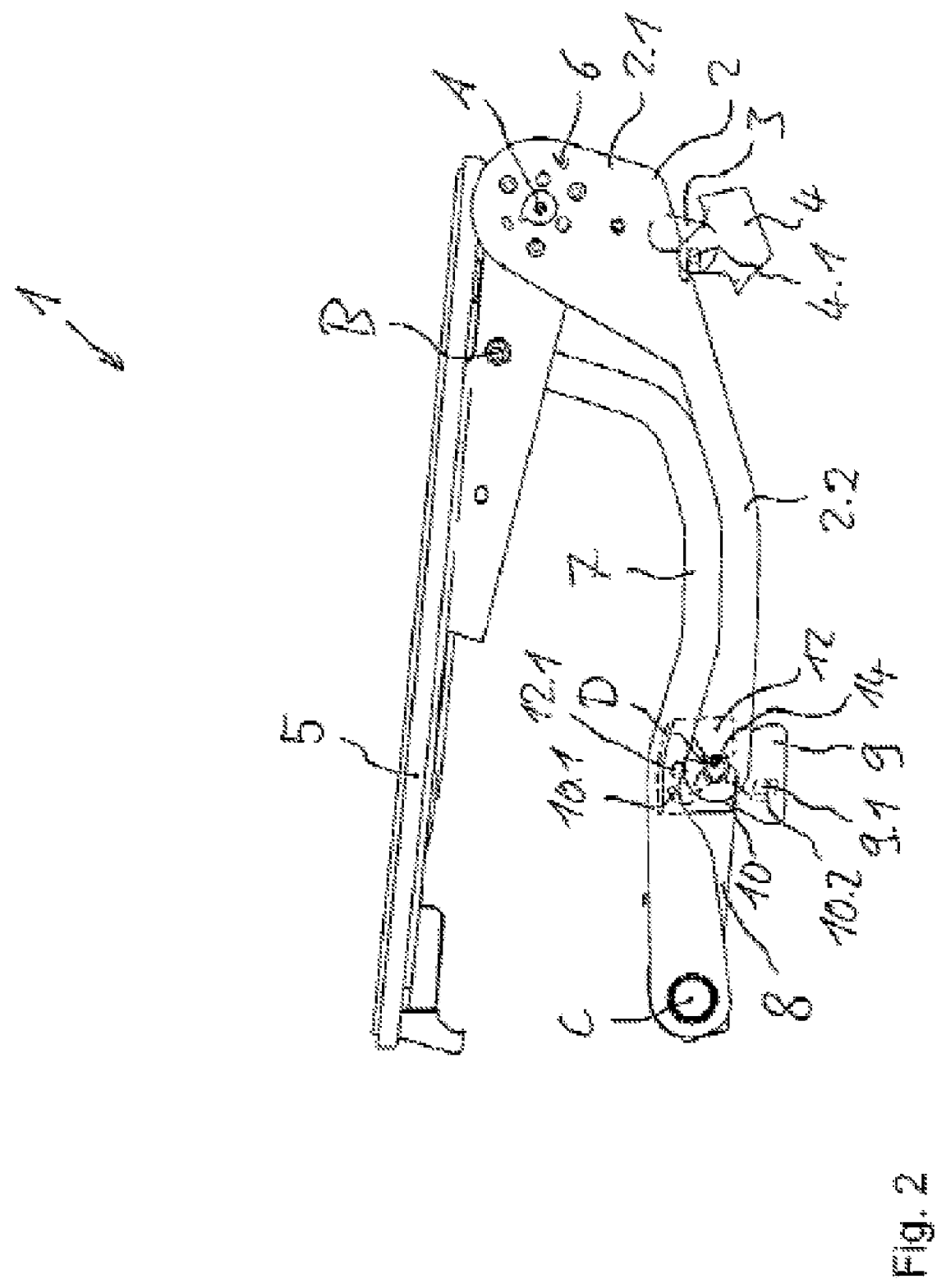

A vehicle seat 1 is represented without cushion and covers in a side view in various positions. Vehicle seat 1 has a foot bracket 2, which represents a frame part having a rear wider console region 2.1 extending upward and a coupling bar region 2.2 extending from console region 2.1 downward and forward. At the bottom side or in the lower region of console region 2.1, a locking catch 3 having a jaw opened toward the front is pivoted, which is locked, as illustrated in FIGS. 1 and 2, on a lower foot 4, e.g., by receiving a pin 4.1 of rear foot 4 extending in the transverse direction.

A seat back 5 is pivoted in a seat back pivot A in a foldable manner on console region 2.1 of foot bracket 2. Between console region 2.1 and seat back 5, e.g., a latch adjuster 6 may be provided, which may allow for the inclination of the seat back to be adjusted within a comfort range or comfort swivel range and which, once unlocked, nay allow for seat back 5 to be folded forward completely about seat back pivot A.

A seat part 7 (seat cushion carrier) is pivoted with its rear end in a hinge B on seat back 5 above the latter's seat back pivot A and extends from hinge B first forward and downward and then forward in the longitudinal direction. On the front end of seat part 7, a front rocker 8 is pivoted in a hinge C, which in turn is pivoted by its lower end on a front foot 9 in a hinge D.

In a hinge 14, a double hook 10 having an upper hook 10.1 and a lower hook 10.2 is attached at the front end of coupling bar region 2.2 of foot bracket 2. Due to the side view in FIGS. 1 to 3, hinge 14 covers hinge D. According to FIGS. 1 and 2, lower hook 10.2 is hooked on a pin 9.1 of front foot 9 such that foot bracket 2 is fastened in front on front foot 9. In this example embodiment, a receptacle 12, which is open towards the bottom is provided on bottom side of seat part 7, which in the use position illustrated in FIG. 1 is initially not relevant.

In the use position illustrated in FIG. 1, the user is able to adjust the inclination of seat back 5 via latch adjuster 6. After releasing latch adjuster 6 via, e.g., an unlocking lever, seat back 5 may be folded forward entirely into the substantially horizontal functional position illustrated in FIG. 2, which is used, e.g., as a table position or loading floor position for extending a loading space behind it.

When folding seat back 5 forward, hinge B of seat part 7 is displaced forward and downward such that seat part 7 is lowered and front rocker 8 swivels forward—counterclockwise—about hinge D. Seat part 7, swiveling away forward and downward, thus makes room for forward-folding seat back 5 and its cushion. Receptacle 12, which is open in the downward direction, receives hinge 14 or its hinge pin, initially without thereby effecting a lock. In this instance, the upper side of seat back 5 may assume a substantially horizontal position, which is suitable as a table position or for extending a loading space located behind it.

Figure 3:
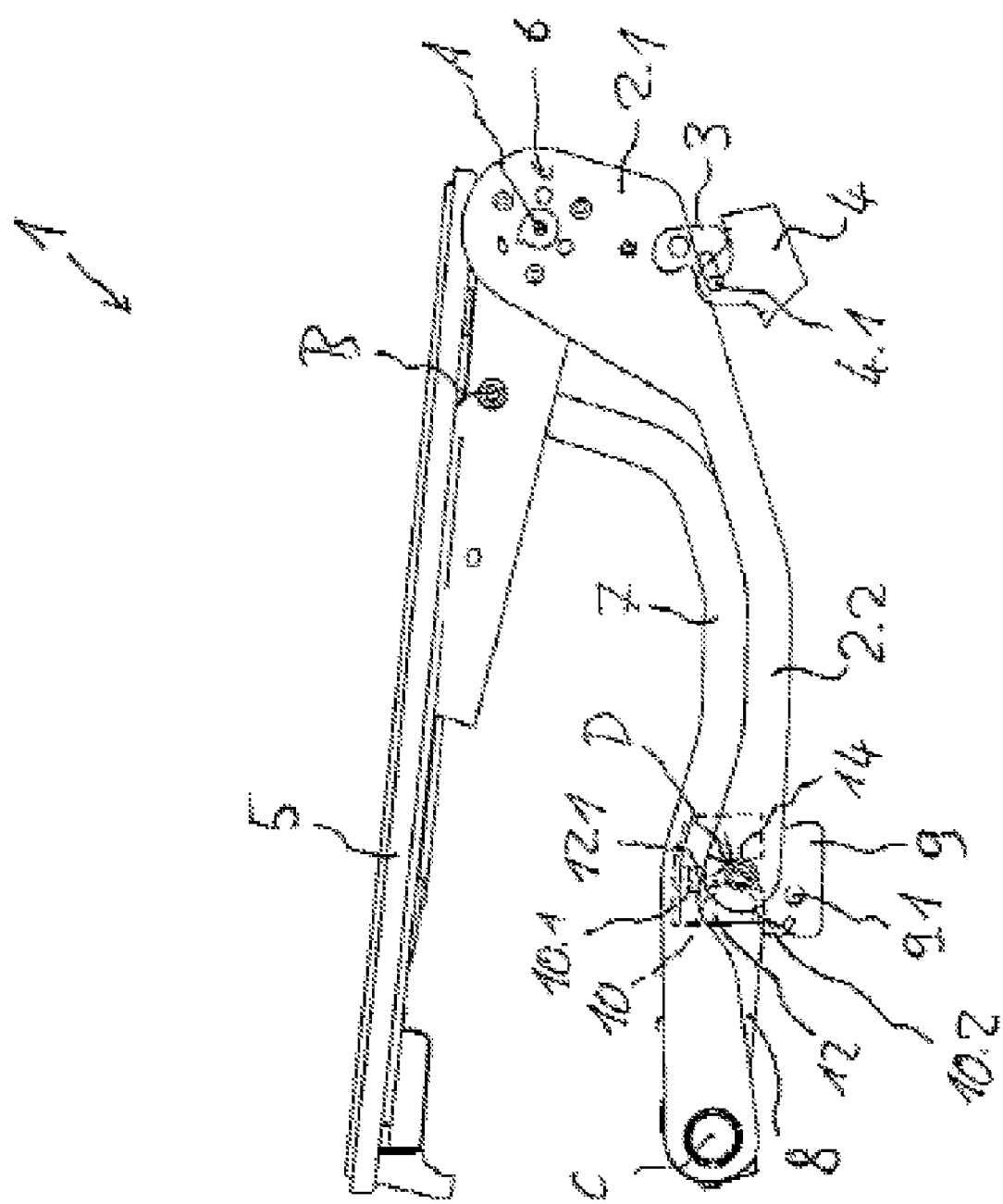
FIG. 3 is a side view of the subsequent unlocking of the foot bracket on the foot side while interlocking with the seat part.

As illustrated in FIG. 2, double hook 10 is furthermore hooked with its lower hook 10.2 on pin 9.1 of front foot 9 and thus foot bracket 2 is fixated on its front end on front foot 9 or on the chassis side. Subsequently, the user swivels double hook 10 in the clockwise direction around its hinge 14, as illustrated in FIG. 3, such that upper hook 10.1 hooks onto a pin 12.1 on the seat part side, which may be provided, e.g., in the region of receptacle 12, and lower hook 10.2 accordingly disengages from front foot 9. As illustrated in FIG. 3, additionally, in the rear region of foot bracket 2, locking catch 3 is swiveled counterclockwise such that pin 4.1 of rear foot 4 is released.

Subsequently, as illustrated in FIG. 4, vehicle seat 1 may be folded forward about hinge C in that the user swivels, e.g., console region 2.1 upward. Vehicle seat 1 assumes the storage position, as illustrated in FIG. 4, in which it frees a substantial space toward the back and forms a substantially vertical closure in front.

The seat is returned to its original position by performing the steps in the reverse order.

As an alternative to receptacle 12, which is open in the downward direction for receiving hinge 14, the component denoted by reference numeral 12 may also be a lock 12, e.g., a rotary-latch lock 12, which receives hinge 14 or a corresponding pin 14 of the foot bracket when seat part 7 is lowered. In such an arrangement, an additional lock between seat part 7 and the foot bracket via double hook 10 is accordingly no longer necessary. Subsequently, rotary-latch lock 12 is to be unlocked again accordingly, it being possible for an unlocking device to be provided, which may be operated, e.g., manually, e.g., via a Bowden cable.

What is claimed is:

1. A vehicle seat comprising:
   a frame part lockable in a rear region on at least one of (a) a rear foot and (b) a chassis side and pivotably hinged on a front hinge;
   a seat back foldably hinged in a seat back pivot on the frame part; and
   a seat part adapted to accommodate a user, the seat part is adjustable downwardly into a lowered position when the seat back is folded forward;
   wherein the seat part, in the lowered position, is interlockable with the frame part locked in a rear lock;
   wherein the frame part together with the lowered and interlocked seat part and the seat back folded forward is foldable forward into a storage position after release of the rear lock; and
   wherein the frame part includes at least one of (a) a two-sided lock device and (b) a swivelable double hook alternatively lockable on a front foot and at least one of (a) the seat part and (b) a pin on the seat part.

2. The vehicle seat according to claim 1, wherein the seat part, in a central region, includes a lock device adapted to interlock with the frame part in the lowered position of the seat part.

3. The vehicle seat according to claim 2, wherein a bottom side of the seat part includes at least one of (a) a lock and (b) a rotary-latch lock adapted to receive at least one of (a) a hinge and (b) a pin arranged on the frame part when the seat part is lowered.

4. The vehicle seat according to claim 2, further comprising a front rocker pivotably arranged between a front region of the seat part and at least one of (a) a front foot and (b) a vehicle chassis, the seat part pivotably arranged on the seat back in a hinge arranged above the seat back pivot, the front rocker swivelable forward when the seat back is folded forward, the front region of the seat part adjustable forward and downward.

5. The vehicle seat according to claim 2, further comprising a front rocker pivotably arranged between a front region of the seat part and at least one of (a) a front foot and (b) a vehicle chassis, the seat part pivotably arranged on the seat back in a hinge arranged above the seat back pivot, wherein the front rocker is swivelable forward when the seat back is folded forward, and the front region of the seat part is thereby adjustable forward and downward.

6. The vehicle seat according to claim 2, wherein the lock device is unlockable by a Bowden cable.

7. The vehicle seat according to claim 1, wherein a bottom side of the seat part includes a form-lockable receptacle adapted to receive a hinge pin of the swivelable double hook.

8. The vehicle seat according to claim 1, wherein the vehicle seat is adjustable in at least the following positions:
   a use position, in which the frame part is locked in front and in the rear on at least one of (a) a vehicle chassis and (b) feet, the seat back is upright, and the seat part is in a raised position arranged to accommodate a user;
   a forward-folded functional position, which is adjustable by unlocking at least one seat back lock between the frame part and the seat back and by folding the seat back forward, the seat part lowered downward and displaced forward; and
   a storage position, which is adjustable from the functional position by:
   locking the seat part on the frame part and releasing a front lock of the frame part;
   releasing a rear lock of the frame part; and
   folding the frame part forwardly together with the seat back and the locked seat part at least one of (a) forward and (b) about a front rocker.

9. The vehicle seat according to claim 8, wherein in the storage position, the vehicle seat is in a substantially vertical orientation.

10. The vehicle seat according to claim 8, wherein in the forward-folded functional position, the seat back is in a substantially horizontal orientation.

11. The vehicle seat according to claim 8, wherein the forward-folded functional position corresponds to at least one of (a) a table position and (b) a loading floor position.

12. The vehicle seat according to claim 1, wherein the frame part is arranged as a foot bracket and includes:
   a rear console region, which includes the seat back pivot having at least one of (a) a seat back lock and (b) a latch adjuster and a rear lock for at least one of (a) a rear foot and (b) the vehicle chassis; and
   a front coupling bar region, which includes a lock device for at least one of (a) a front foot and (b) the seat part.

13. The vehicle seat according to claim 12, wherein a front rocker is pivotably arranged on the front coupling bar region.

14. The vehicle seat according to claim 1, further comprising a latch adjuster adapted to adjust an inclination of the seat back.

15. The vehicle seat according to claim 1, wherein the frame part is unlockable by a Bowden cable.

16. The vehicle seat according to claim 1, wherein the rear lock is releasable by a Bowden cable.

17. The vehicle seat according to claim 1, wherein the at least one of (a) the two-sided lock device and (b) the swivelable double hook is unlockable by a Bowden cable.

18. A vehicle seat, comprising:
   frame means lockable in a rear region on at least one of (a) a rear foot and (b) a chassis side and pivotably hinged on front hinge means;
   seat back means foldably hinged in a seat back pivot means on the frame means; and
   seat part means for accommodating a user, the seat part means adjustable downwardly into a lowered position when the seat back means is folded forward;
   wherein the seat part means, in the lowered position, is interlockable with the frame means locked in a rear lock means;
   wherein the frame means together with the lowered and interlocked seat part means and the seat back means folded forward is foldable forward into a storage position after release of the rear lock means; and
   wherein the frame means includes at least one of (a) two-sided lock means and (b) swivelable double hook means alternatively lockable on a front foot and at least one of (a) the seat part means and (b) in means on the seat part means.

19. A motor vehicle, comprising:
   a vehicle seat including:
   a frame part lockable in a rear region on at least one of (a) a rear foot and (b) a chassis side and pivotably hinged on a front hinge;
   a seat back foldably hinged in a seat back pivot on the frame part; and
   a seat part adapted to accommodate a user, the seat part is adjustable downwardly into a lowered position when the seat back is folded forward;
   wherein the seat part, in the lowered position, is interlockable with the frame part locked in a rear lock;
   wherein the frame part together with the lowered and interlocked seat part and the seat back folded forward is foldable forward into a storage position after release of the rear lock: and
   wherein the frame part includes at least one of (a) a two-sided lock device and (b) a swivelable double hook alternatively lockable on a front foot and at least one of (a) the seat part and (b) a pin on the seat part.

* * * * *